United States Patent [19]
Tanaka et al.

[11] Patent Number: 5,911,327
[45] Date of Patent: Jun. 15, 1999

[54] METHOD OF AUTOMATICALLY DISCRIMINATING AND SEPARATING SCRAPS CONTAINING COPPER FROM IRON SCRAPS

[75] Inventors: Fumio Tanaka; Toshio Akagi; Shuji Naito; Sumitada Kakimoto; Michiaki Sakakibara; Masahiro Ito, all of Futtsu City; Akihiro Senda, Narashino, all of Japan

[73] Assignee: Nippon Steel Corporation, Tokyo, Japan

[21] Appl. No.: 08/733,240

[22] Filed: Oct. 2, 1996

[51] Int. Cl.⁶ .............................. B07C 5/342; G01J 3/50
[52] U.S. Cl. .................... 209/580; 209/44.1; 209/3.2; 209/582
[58] Field of Search ................... 209/580, 581, 209/582, 44, 44.1, 3, 3.1, 3.2

[56] References Cited

U.S. PATENT DOCUMENTS

| | | | |
|---|---|---|---|
| 3,762,546 | 10/1973 | Keitel et al. .......................... | 209/582 |
| 3,768,739 | 10/1973 | George .................................. | 241/17 |
| 3,905,556 | 9/1975 | Drage ..................................... | 209/44 |
| 5,133,505 | 7/1992 | Bourcier et al. .................... | 209/40 |
| 5,443,164 | 8/1995 | Walsh et al. ......................... | 209/580 |
| 5,520,290 | 5/1996 | Kumar et al. ........................ | 209/580 |

FOREIGN PATENT DOCUMENTS

| | | |
|---|---|---|
| 5-96249 | 4/1993 | Japan . |
| 5-131175 | 5/1993 | Japan . |
| 6-323912 | 11/1994 | Japan . |

Primary Examiner—William E. Terrell
Assistant Examiner—Patrick Mackey
Attorney, Agent, or Firm—Kenyon & Kenyon

[57] ABSTRACT

Scrap containing copper is discriminated from iron scrap after being pulverized by imaging iron scrap using a color TV camera, treating RGB signals processed by each of the points in the image as a color vector, and discriminating scrap containing copper from iron scrap when the saturation value of the color vector is larger than a predetermined value and the hue angle of the color vector lies within a predetermined range.

8 Claims, 15 Drawing Sheets

32   33

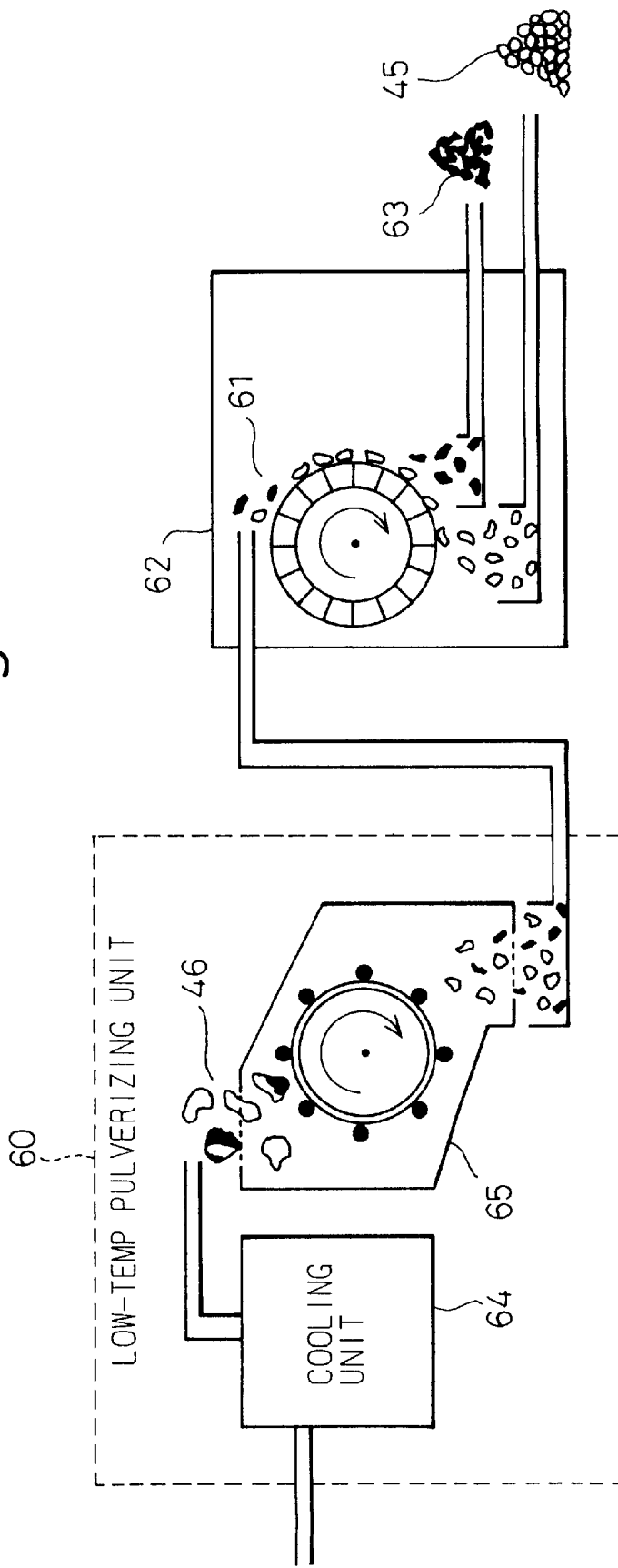

ABSTRACT# METHOD OF AUTOMATICALLY DISCRIMINATING AND SEPARATING SCRAPS CONTAINING COPPER FROM IRON SCRAPS

BACKGROUND OF THE INVENTION

1. Field of the Invention

The present invention relates to a method of automatically discriminating and separating scraps containing copper, which is an impurity element, from iron scrap in a process for regenerating iron scraps.

2. Description of the Related Art

To avoid a drop in the quality of iron produced by the regeneration of scrap, it is necessary to prevent the infiltration of non-ferrous impurity elements such as copper, zinc, tin and the like which are usually called tramp elements. Zinc and tin chiefly exist on the surface layers of plated steel plates, whereas copper exists, chiefly in the form of copper wire, in the motor cores of automobiles and household electric appliances. Therefore, the most effective method of preventing the infiltration of copper is to discriminate and separate copper in the stage of pulverization into scrap.

At the site for regenerating scraps, so far, scrap consisting chiefly of motor cores containing copper are discriminated, by eye, by the workers. However, the discrimination operation based upon the human eye involves problems; i.e., (1) it is difficult to increase the amount of scrap processed, (2) it is economically difficult to spend large amounts on labor cost, (3) it is difficult to maintain uniform quality of the scrap after the copper is removed, (4) it is difficult to improve the working environment, etc.

In order to automatically carry out this operation, there has been proposed a method of automatically discriminating the scrap by irradiation with a laser beam (Dr. H.-P Sattler: VDI BERICHTE NR. 934, 1991: Scrap Sorting with Laser—An Automatic Process for Mixed Non-Ferrous Metals from Automobile Shredders).

However, the above-mentioned method utilizes an expensive pulse laser irradiator which makes it difficult to cut the cost of the apparatus. Besides, the laser device and the spectroscope must be used in an adverse environment, requiring cost and labor for the maintenance of the apparatus. In order to automatically discriminate the scrap containing copper at a low cost, the present inventors have already filed a patent application covering an automatic discrimination method based upon the hue angle (Japanese Unexamined Patent Publication (Kokai) No. 6-323912; Method of Discriminating Scrap Containing Copper from Iron Scrap). According to the method based upon the hue angle only, however, the hue angle loses stability in scrap where the saturation value is low, and the precision of discriminating copper from iron decreases. Therefore, a first requirement for the present invention is to improve the discrimination precision in the method of automatically discriminating scrap containing copper relying upon the hue angle.

A motor core, which is the main source of mixing copper has copper wires and core which are mechanically entangled together and cannot be separated by magnetic separation. Therefore, copper and iron are discriminated, by eye, by the workers and are separated by hand as the motor cores are conveyed on a belt conveyer.

As an apparatus for sorting the wastes utilizing a difference in color, there has been proposed, for example, a cullet separator depending upon color as disclosed in Japanese Unexamined Patent Publication (Kokai) No. 5-96249. According to this apparatus, the glass cullets are automatically sorted depending upon the color. That is, the colors of the cullets are discriminated by color images from a CCD camera, and a sorting drum having an air suction port is driven depending upon the color of a cullet that is to be sorted. However, this method is not utilizable for discriminating the scraps like those of the motor cores that include the colors of iron and copper in a mixed manner with other iron scrap.

In order to separate the copper-containing scrap after the discrimination and separation processing, it is necessary to recognize the individual scraps in the discrimination processing and to find position data for the copper-containing scrap.

Therefore, a second requirement of the present invention is to create a discrimination method which makes it possible to precisely discriminate the copper-containing scrap which has iron and copper color, like the scrap of motor cores, from iron scrap, and to obtain position data for the copper-containing scrap.

According to the above-mentioned discrimination method using a laser beam, the individual bits of scrap must be reliably irradiated with the laser beam making it necessary to arrange the individual scraps in alignment. Therefore, an aligning device must be employed. Besides, the processing efficiency becomes very low.

Therefore, a third requirement of the present invention is to realize a discriminating/separating apparatus for efficiently and automatically separating copper-containing scrap, like motor cores, from the scrap in which is mixed other iron scrap.

Furthermore, a method has been proposed for shock-pulverizing the iron scraps by cooling them to a temperature at which they become brittle as disclosed in, for example, Japanese Unexamined Patent Publication (Kokai) No. 48-24351.

According to this method, the whole scrap a part of which has magnetic properties is cooled and shock-pulverized though the ratio of the scrap groups having magnetic properties to the whole scrap is merely several percent by weight after pulverized at normal temperature. Therefore, this method is not economically efficient since a liquefied gas which is the method of cooling is very expensive, and this method is not utilized for separating scrap into copper scrap and iron scrap.

Therefore, a fourth requirement of present invention is to provide a method which automatically discriminates and separates scrap having magnetic properties from the scrap pulverized at normal temperature, i.e., automatically discriminates and separates scrap in which are mixed iron scrap and copper-containing scrap such as the scrap from motor cores, shock-pulverizes the scrap that is separated as copper-containing scrap by cooling them to a temperature lower than the temperature at which iron undergoes brittle fracture, and magnetically sorts the thus pulverized scrap to completely separate it into iron scrap and copper scrap, making it possible to regenerate large amounts of scrap at a low cost without relying upon human hands.

SUMMARY OF THE INVENTION

In a process for discriminating and separating scrap containing copper from iron scrap after it is pulverized, a first invention is concerned with a method of automatically discriminating scrap containing copper from iron scrap, comprising:

imaging iron scrap using a color TV camera;

finding a saturation value represented by RGB signals from each of the points in the image;

finding a hue angle represented by RGB signals from each of said points in the image;

discriminating whether the saturation value of each of said points is larger than a preset value or not;

discriminating, when the saturation value of each of said points is larger than the preset value, whether the point on the scrap corresponding to each of said points is copper or not relying upon whether the hue angle of each of said points lies within a preset range of hue angles of copper or not; and executing the above-mentioned process for all of said points in the image.

Referring to FIG. 1, a color TV camera 3 images a range in which copper in the iron scrap 1 needs to be discriminated in a state where the iron scrap 1 is illuminated by a source of light 2. When the imaging can be accomplished by the color TV camera without using the source of light, then, the source of light need not be used. The following processes are executed for all points on the image in order to discriminate the presence or absence of copper.

(1) RGB signals 5 and synchronizing signals 6 are obtained from the output of the color TV camera through an image signal processing circuit 4. (2) Position data of all points in the image are obtained from the synchronizing signals 6. (3) A saturation value 7 and a hue angle 8 are found from the RGB signals of each of the points in the image. (4) It is checked whether the saturation value at each of the points is larger than a preset value that is necessary for discriminating copper (12). When the saturation value is larger than the preset value, a discrimination process (5) is executed. When the saturation value is smaller than the preset value, the discrimination process (5) is not executed, and an integrated discrimination unit 13 discriminates that it is not copper. (5) A hue angle is found for each of the points and is compared with a relationship between the material vs. hue angle range stored in an operation unit 10, and it is discriminated whether the hue angle is within a range of copper (11). When the hue angle is within the range, the integrated discrimination unit 13 discriminates that a point on the scrap corresponding to the above-mentioned point is copper. (6) The position data 15 and the discriminated results 14 of all points in the image are output.

In this specification, the saturation value is as shown in FIG. 2; i.e., the RGB components of color data are treated as a color vector 17 in three-dimensional space. A point at which the color vector 17 intersects a unit plane 16 (expressed by R=G=B=1) is denoted by P (18). Referring to FIG. 3, the color vector 17 is observed from a direction perpendicular to the unit plane 16 on the same space. In this case as shown in FIG. 3, the length of a line segment )' P19 that is projected onto the unit plane 16 and is normalized by a radius 0' S1 of a circle S1·S2·S3 is regarded as saturation.

In this specification, furthermore, the hue angle is as shown in FIG. 2; i.e., the RGB components of color data are treated as a color vector 17 in three-dimensional space. A plane is considered in which the color vector 17 is observed from a direction perpendicular to the unit plane 16 (FIG. 4). In this case, an angle θ20 defined by an observation axis 0' R' 21 of an R-axis and a line segment 0' P in color space (FIG. 2) is regarded to be a hue angle ($0° \leq \theta < 360°$).

The gist of the second invention resembles the gist of the first invention but is different in regard to:

labelling the whole image using a brightness value I which represents the brightness of a pixel to recognize the bits of scrap, and finding the total area St of the bits of scrap or finding the number of pixels occupied by the scrap;

finding the total number of the pixels discriminated to be copper area SCu or discriminated to be copper in the image region occupied by the scrap; and finding a ratio R=SCu/St of St to the copper area SCu for each of the scraps, discriminating the scrap to be a copper-containing scrap when the ratio R is larger than a preset value Rmin, and finding a pixel address at the center of gravity (X, Y) thereof or at the center of gravity of the total area St.

The gist of the third invention resembles the gist of the second invention but is different in regard to using an apparatus for discriminating and separating copper-containing scrap, which comprises a separator control means for receiving position (X, Y) data of all copper-containing scrap in the image and the imaging time from the discrimination processing means, calculating a time delay of the copper-containing scrap that are conveyed to the separator means based upon the position (X, Y) data and the imaging time, and driving said separator means when the copper-containing scrap has arrived at said separator means.

Referring to FIG. 5, shredder scrap such as of automobiles and household electric appliances is subjected to a suitable pretreatment such as air sorting and vortex sorting to separate metal scrap which is then subjected to magnetic sorting so as to be separated scrap having magnetic properties. The thus separated iron scrap containing motor cores is thrown onto a conveyer means 40 such as belt conveyer or the like. Here, a variety of means can be used as the throwing means (not shown) such as a belt conveyer from the preceding process or a vibrating feeder.

The image signals, picked up by an imaging means 41 which color-images the scrap 1, on the conveyer means 40 are transmitted to a discrimination means 42 where position (X, Y) data of all copper-containing scrap in the image are found and are transmitted together with the imaging time to a separator control means 43. The separator control means 43 calculates the time delay of the copper-containing scrap that is conveyed to a separator means 44 based upon the position (X, Y) data and the imaging time, and outputs a control signal for driving the separator means 44 when the copper-containing scrap has arrived. As a result, the scrap is separated by the separator means 44 into iron scrap 45 and copper-containing scrap 46.

The copper-containing scrap in the iron scrap 1 are discriminated as described above. Here, for example, a color TV camera is used as the imaging means 41, and the RGB signals transmitted from the color TV camera which is the imaging means 41 are converted by an HSI converter 5 in the discrimination means 42 that is shown in FIG. 1, and are transmitted to the discrimination unit 9. The separator control means 43 for the separator means 44 installed at a rear part in the conveying direction of the conveyer means 40, executes so-called tracking processing to correct the time delay for conveying the scrap and executes the required separation process at the time when the scrap arrives at the separator.

The processing by the discrimination unit 9 includes complex image processing which, depending upon the case, cannot be executed in real time. In such a case, the imaging time signal 11 is transmitted to the separator control means 43 as shown in FIG. 1 to execute a suitable tracking processing. When the processing can be executed in real time by the discrimination unit 9, it need not be pointed out that the tracking processing can be suitably executed by correcting the conveyance time delay only without transmitting the imaging time signal 11 to the separator control unit.

Upon receiving a drive instruction, i.e., a pulse signal from the separator control means 43, the separator means 44 works to separate the copper-containing scrap from the scrap. When no drive instruction is received, the separator means 44 works to separate iron scrap from the scrap that is conveyed.

The gist of the fourth invention resembles that of the third invention but is different in regard to discriminating and separating iron and copper from the scrap having magnetic properties after they have been pulverized at normal temperature by:

shock-pulverizing the copper-containing scrap that is separated by the separator means by cooling it at a temperature lower than the brittle fracture temperature of iron using a liquefied gas for cooling; and magnetically separating the shock-pulverized scrap into iron scrap and copper scrap.

Referring to FIG. 6, the iron scrap 45 separated by the separator means 44 is conveyed as a starting material for producing steel. On the other hand, the copper-containing scrap 46 is conveyed into a low-temperature pulverizing means 60 where the copper-containing scraps are cooled to a temperature lower than the brittle fracture temperature of iron using a liquefied gas for cooling and are shock-pulverized. Due to shock-pulverization by the low-temperature pulverizing means, iron in the copper-containing scraps is pulverized into fine pieces. As a result, an iron and copper mixture of scrap 61 consisting of fine pieces of iron and copper are conveyed into the magnetic sorting unit 62. The fine iron scrap and the copper scrap consisting chiefly of pulverized copper wire from motor cores are easily separated into iron scrap 45 and copper scrap 63 by the magnetic sorting unit. The iron scrap is conveyed as a starting material for producing steel and the copper scrap is conveyed as a starting material for producing copper.

BRIEF DESCRIPTION OF THE DRAWINGS

FIG. 21 is a diagram of an apparatus for pulverizing the copper-containing scrap at a low temperature and for magnetically sorting it.

DESCRIPTION OF THE PREFERRED EMBODIMENTS

Figure 7:
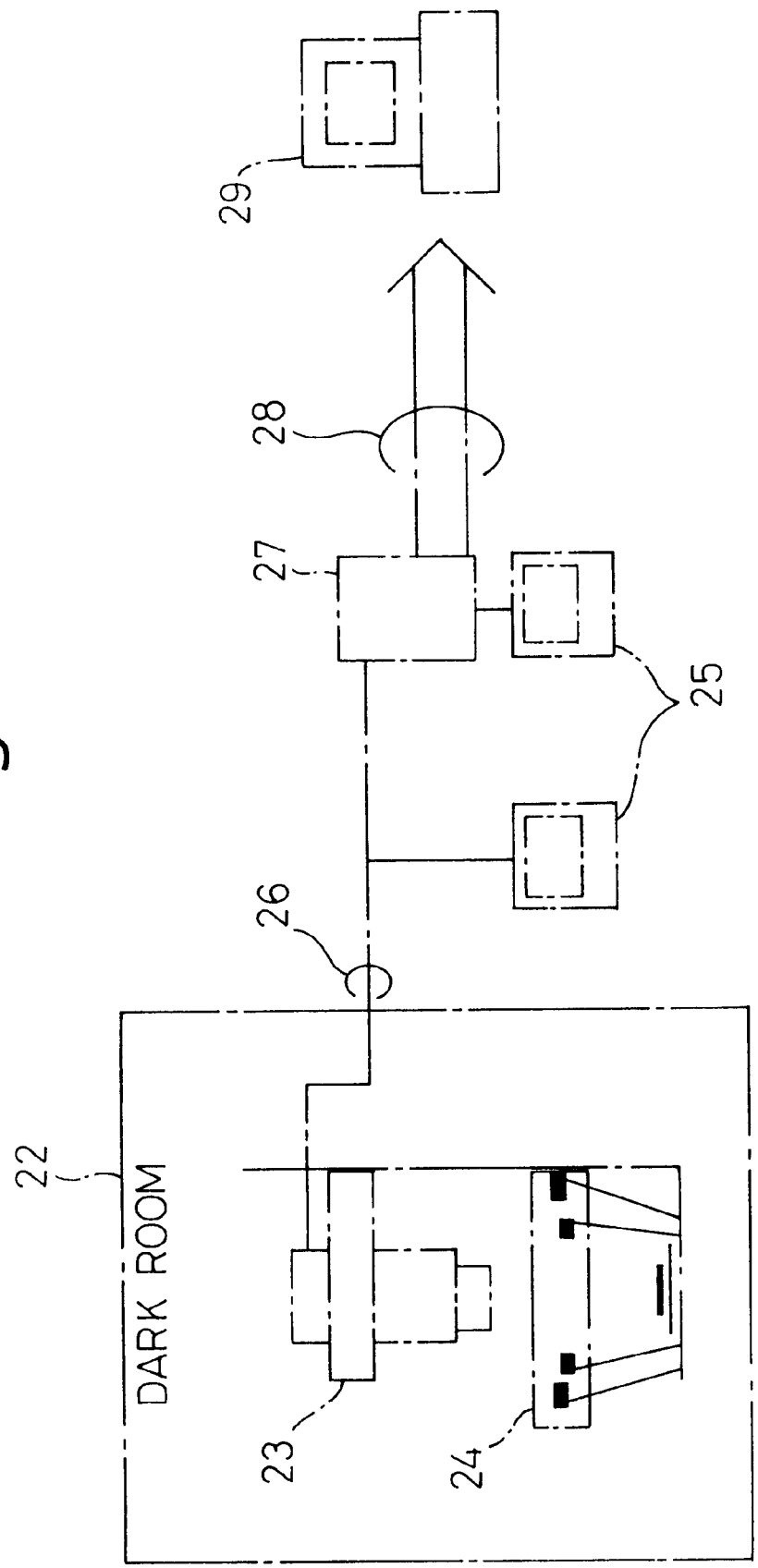
FIG. 7 is a diagram illustrating the constitution of an automatic discriminating apparatus according to an embodiment.

FIG. 7 illustrates the constitution of an apparatus according to a first embodiment of the present invention. In this embodiment, a dark room 22 is provided to decrease the effect of light such as of fluorescent lamps in the room, and the measurement is taken in the dark room 22. There are employed a four-point type source of light 24 and a CCD camera 23 as a color TV camera. The four-point type source of light is to illuminate the scraps from four directions. When compared with a source of light for illuminating from one direction only, the four-point type source of light decreases the shade on the scrap and on the plate thereof.

Figure 1:
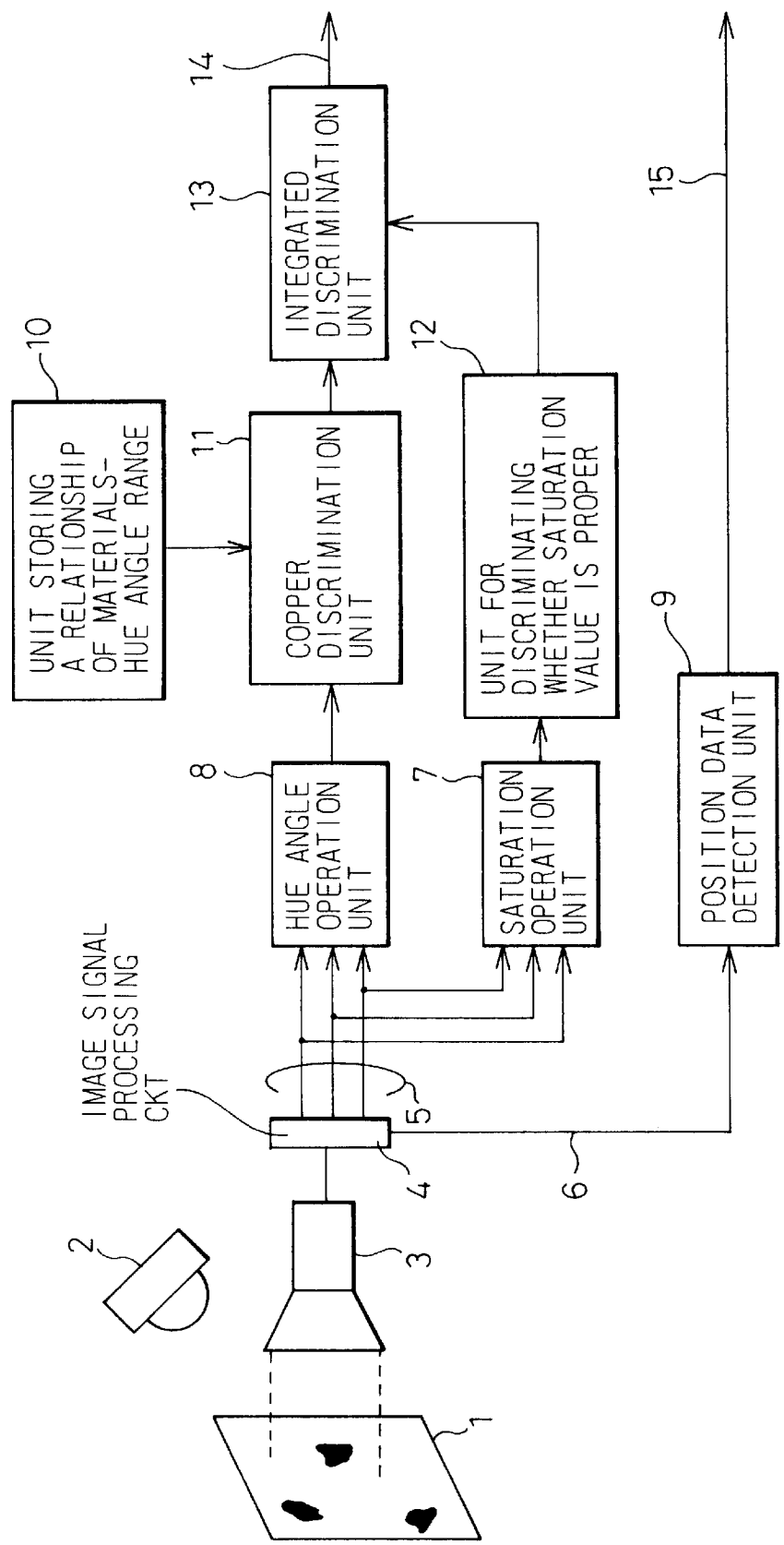
FIG. 1 is a diagram schematically illustrating the constitution of a discriminating apparatus according to the present invention.
Figure 2:
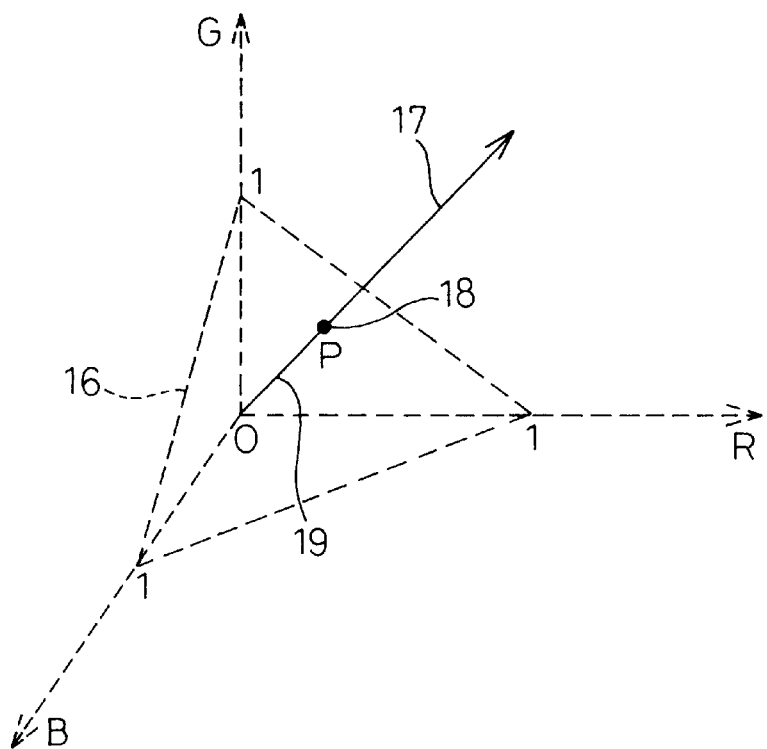
FIG. 2 is a diagram illustrating the concept of color space.

The source of light needs not necessarily be limited to the four-point type source of light provided it is capable of confining the shade within a range that does not interrupt the discrimination processing. As shown in FIG. 1, the discriminating apparatus 29 includes a hue angle operation unit 8, a saturation operation unit 7, a unit 10 for storing a relationship of material to the hue angle range, a copper discrimination unit 11, a unit 12 for discriminating whether the saturation value is proper or not, and a hue angle—saturation value integrated discrimination unit 13, and outputs a discriminated result 14 and position data 15.

In order to simplify the timing processing by which the discriminating apparatus 29 picks up the iron scrap image taken by the CCD camera 23 according to this embodiment, the image taken by the CCD camera is stored in an image storage unit 27, and RGB data are taken out at any time by the discriminating apparatus 29. However, it need not be pointed out that the discriminating apparatus can be constituted even without the image storage unit 27.

According to this embodiment, it was attempted to automatically discriminate copper in the compressed scrap of the motor cores made up of iron and copper. Prior to practically conducting the discrimination testing, a preliminary test was conducted to define the saturation values and the boundaries of hue angles for discrimination. Under optical conditions (source of light 24, condition for operating the CCD camera 23, dark room 22, distance between the instrument and the scrap to be discriminated) the same as those during the discrimination operation, distributions of hue angles were measured, the distributions of hue angles being those possessed by the copper scraps, iron scraps and the plate on which the scraps were placed. Under the same conditions, furthermore, the distributions of saturation values possessed by the copper scraps, iron scraps and the plate were measured.

Figure 8:
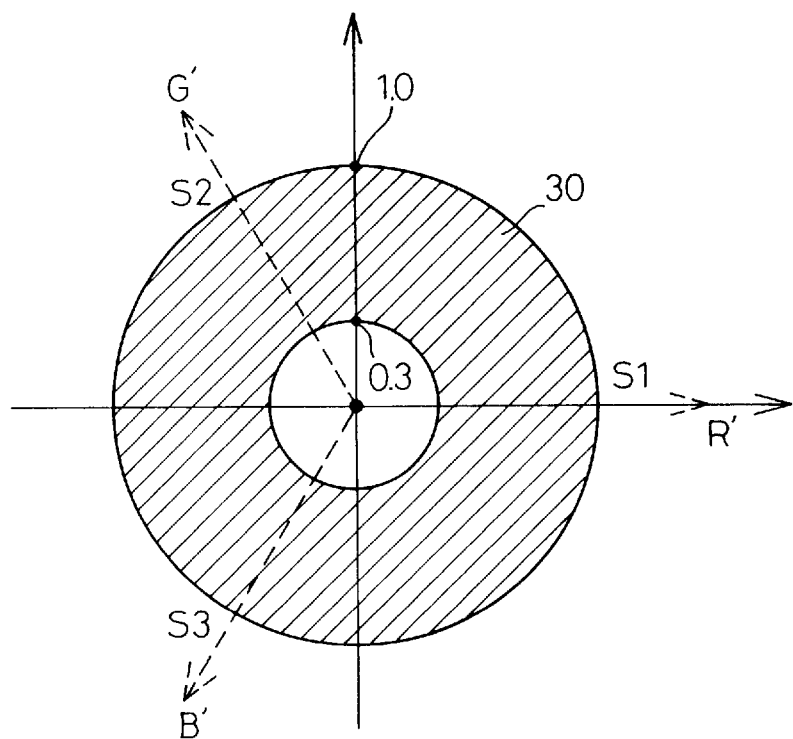
FIG. 8 is a diagram illustrating a suitable range of saturation values according to the embodiment.
Figure 9:
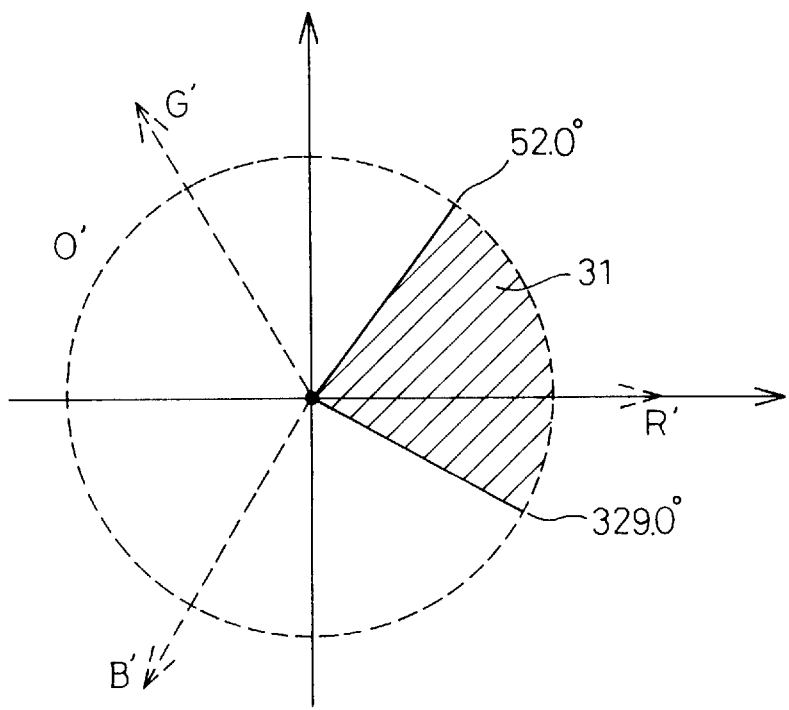
FIG. 9 is a diagram illustrating a range of color angles possessed by copper according to the embodiment.

From the results of these preliminary tests, the range of suitable saturation values (sat) for discriminating copper and the range of hue angles (hue) possessed by copper were found. As shown in FIGS. 8 and 9, the saturation values were ($0.3 \leq sat \leq 1.0$) 30, and the hue angles were ($0° \leq hue \leq 52°$ and $329° \leq hue \leq 360°$) 31. In the discrimination testing described below, the saturation values and the boundaries of hue angles for discrimination were used.

Figure 10:
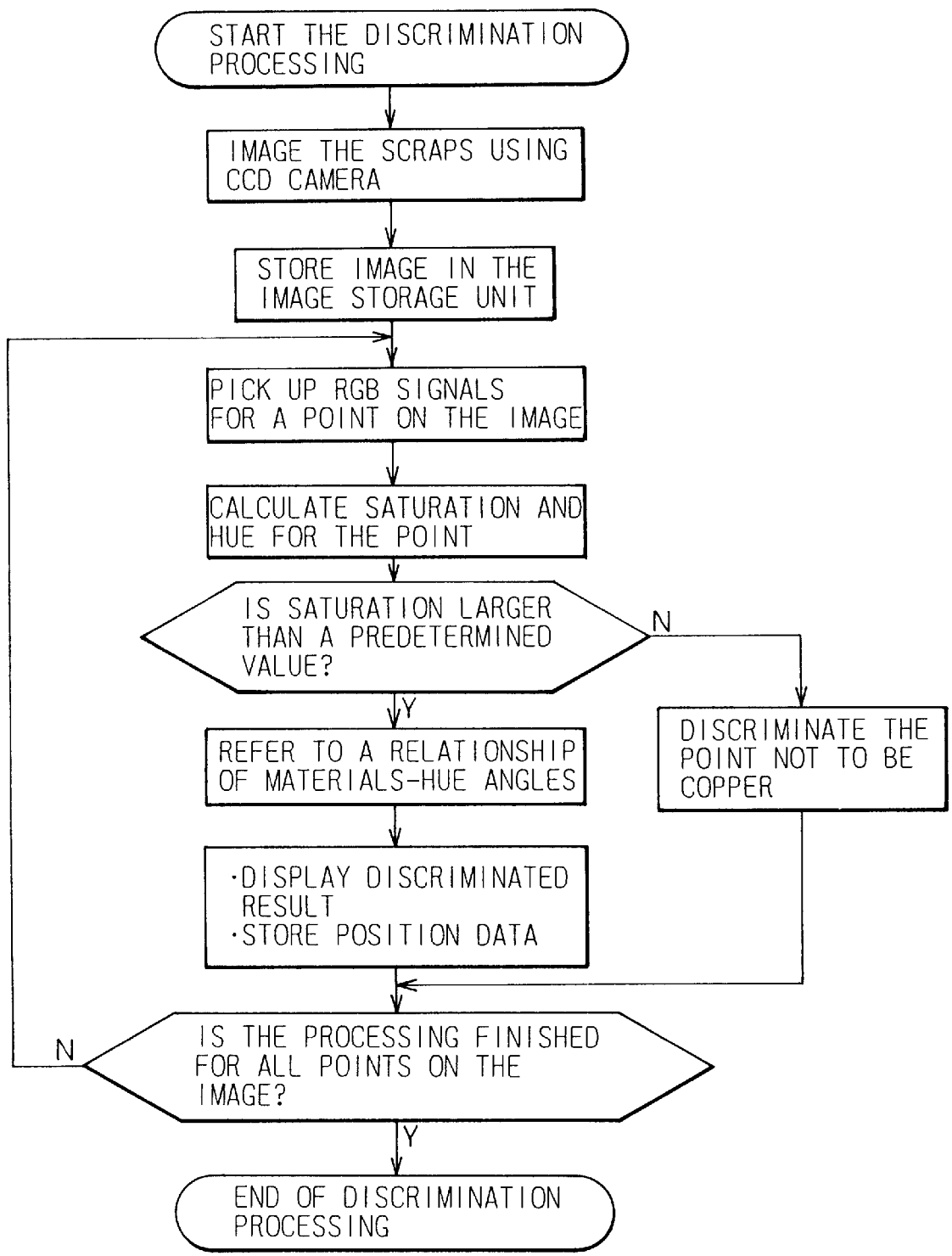
FIG. 10 is a flow chart illustrating a processing according to the embodiment.

FIG. 10 is a flow chart illustrating the procedure of the discrimination method according to the embodiment. This procedure is practically executed by the discriminating apparatus.

In this embodiment, the points at which the saturation values fail to reach a predetermined value were so determined that the points on the corresponding scraps were not copper without making reference to the hue angles.

Figure 3:
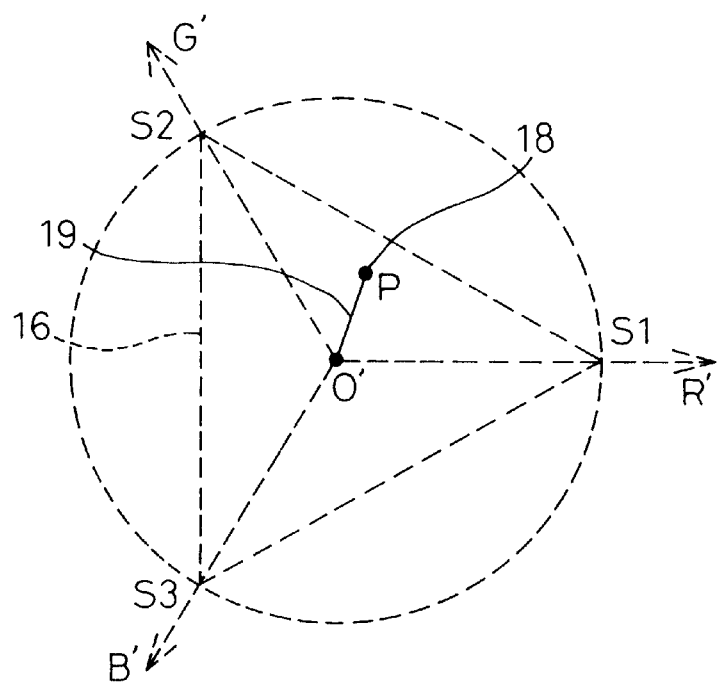
FIG. 3 is a diagram defining the saturation value.
Figure 4:
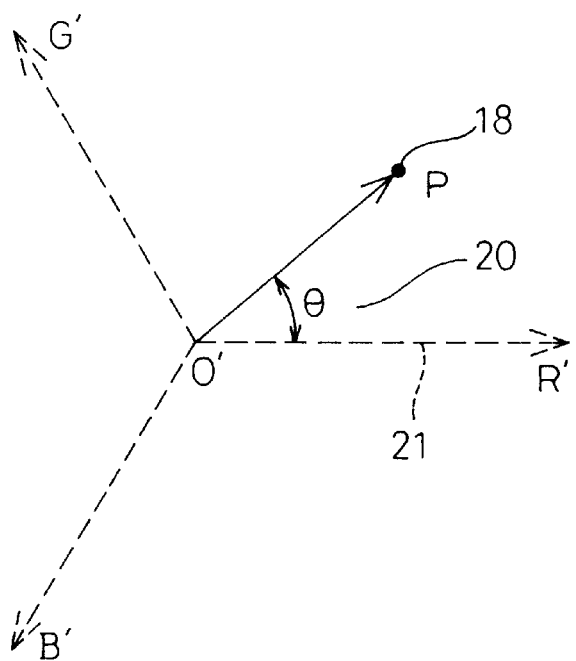
FIG. 4 is a diagram defining the color angle.
Figure 5:
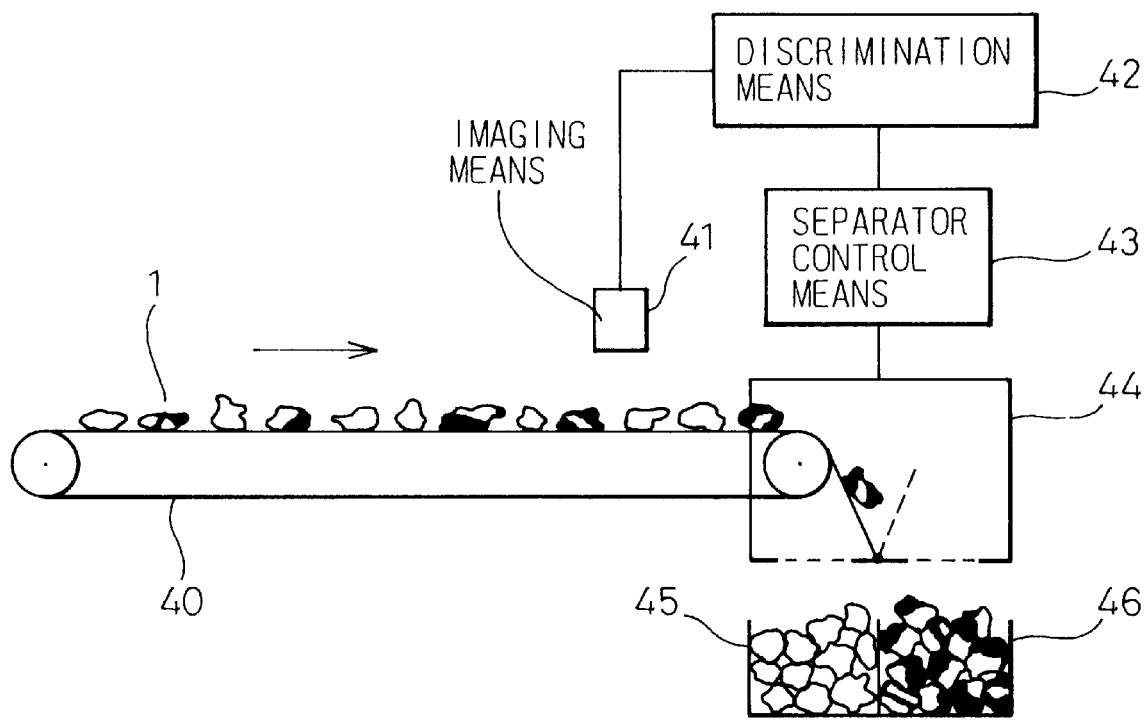
FIG. 5 is a diagram illustrating the constitution of a discriminating/separating apparatus according to the present invention.
Figure 6:
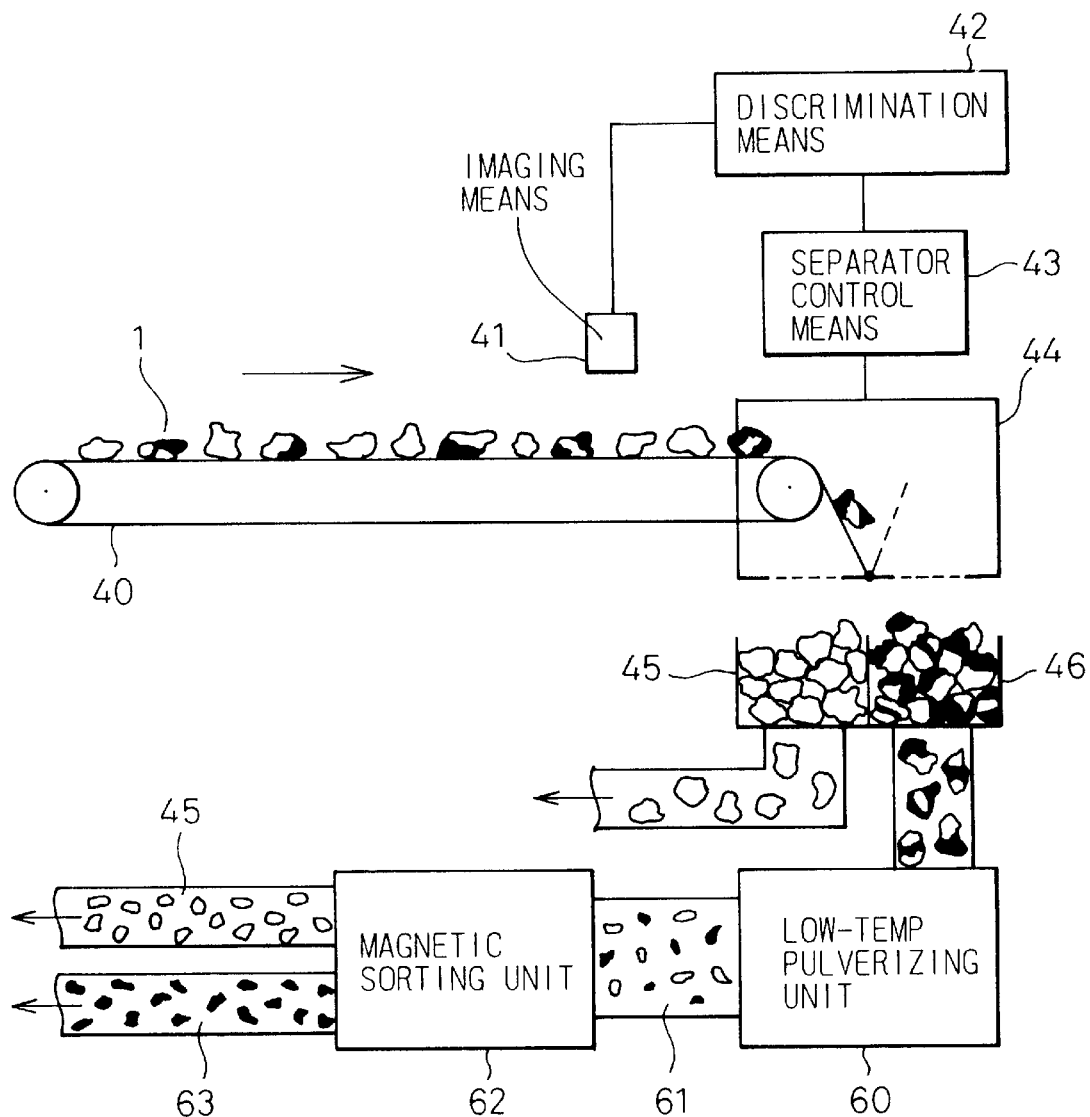
FIG. 6 is a diagram illustrating the constitution of an imaging means and a discrimination means according to the present invention.

In this embodiment, the discrimination processing was executed for the points obtained by decomposing the imaged picture into 77440 pixels (320×242 pixels). The saturation values and hue angles of these points were calculated by the discriminating apparatus 29 based upon the definitions shown in FIGS. 3 and 4. The points having saturation values in excess of ($0.3 \leq sat \leq 1.0$) 30 were discriminated in regard to whether their hue angles were confined within a range of ($0° \leq hue \leq 52°$ and $329° \leq hue \leq 360°$) 31.

Concerning the points of which the saturation values and hue angles were both confined within the abovementioned ranges, it was so discriminated that copper was present and, for example, red points were indicated on corresponding points on the display window of the discriminating apparatus 29. Concerning the points at which the saturation values or the hue angles were not confined within the abovementioned ranges, it was so discriminated that copper was not present and, for example, blue points were indicated on the corresponding points on the display window of the discriminating apparatus 29.

The above-mentioned processing was executed for all points within a range imaged by the CCD camera. The result of discrimination was graphically displayed in color on the display window of the discriminating apparatus 29. That is, the portions corresponding to copper on the scraps were displayed in red and the portions that did not correspond to copper were displayed in blue.

Figure 11:
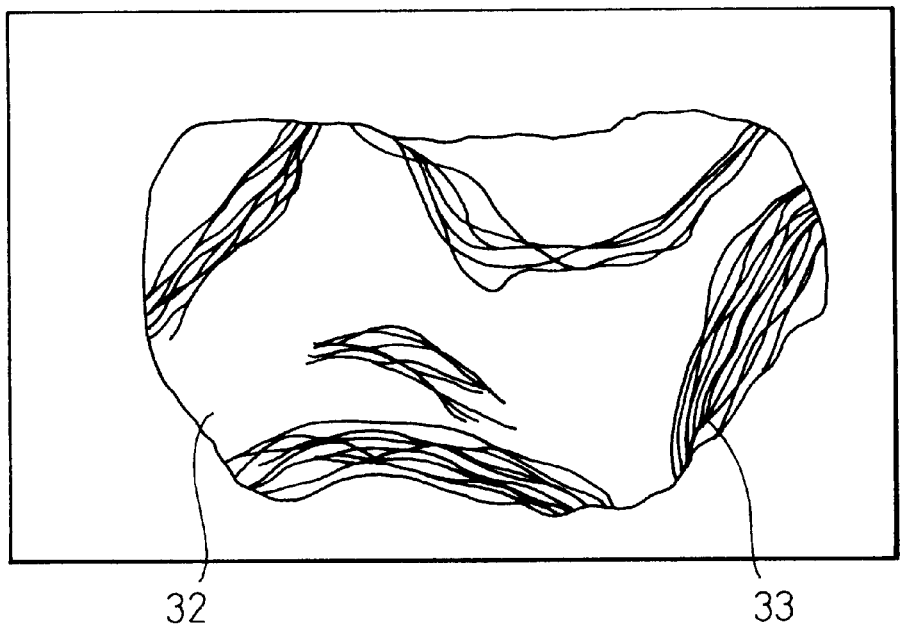
FIG. 11 is a diagram schematically illustrating the image of compressed scrap of a motor core that is to be discriminated according to the embodiment.
Figure 12:
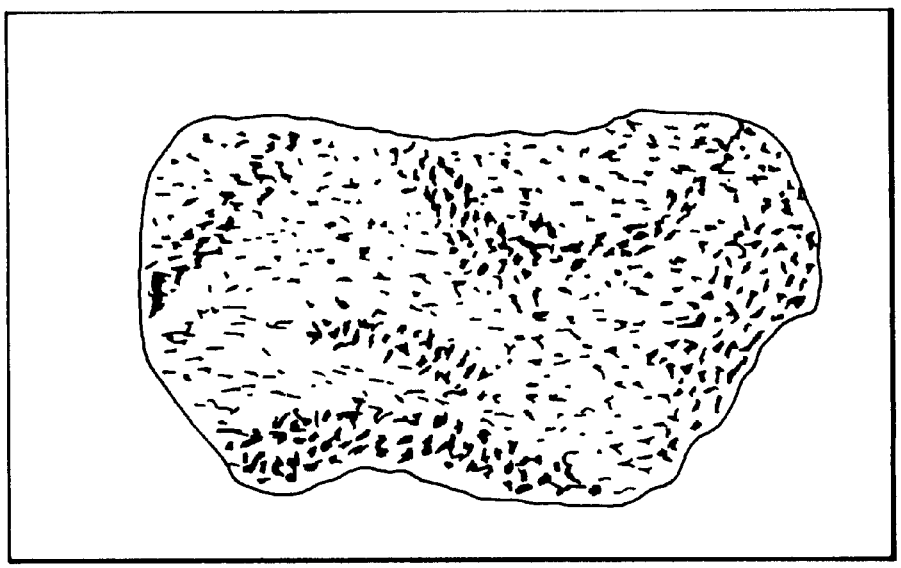
FIG. 12 is a diagram schematically illustrating the discriminated result 1 according to the embodiment.
Figure 13:
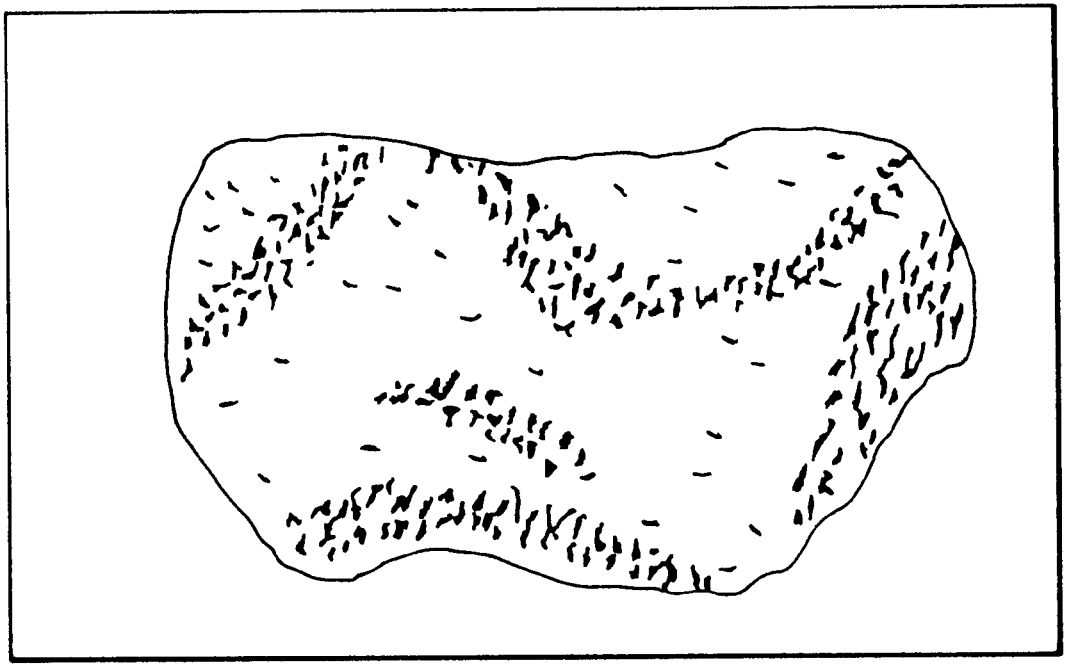
FIG. 13 is a diagram schematically illustrating the discriminated result 2 according to the embodiment.

FIG. 11 schematically illustrates an image of motor core scrap before being discriminated. As shown, the motor core scrap consists of an iron core 32 entangled by copper wires 33. FIG. 12 schematically illustrates the discriminated result of copper using hue angles only. The initial result is a red color indication of a portion of which the hue angles are confined within ranges of from 0.0° to 52.0° and from 329.0° to 360° (31 in FIG. 9). In FIG. 12, the portions indicated in red in the result are displayed in black. FIG. 13 shows the result of when copper is discriminated using saturation values and hue angles. The portions having saturation values of not smaller than 0.3 and hue angles of from 0.0° to 52.0° and from 329.0° to 360° (31 in FIG. 9) are displayed in black.

As will be obvious from the comparison of FIG. 11 with FIG. 12, the iron component of the scrap of FIG. 11 is often discriminated as copper in FIG. 12. Here, if FIG. 12 is compared with FIG. 13, the iron component of the initial image erroneously discriminated as copper is conspicuously decreased. According to the results output by the discriminating apparatus 29, the number of pixels displayed in red is 17210 in FIG. 12, and the number of pixels displayed in red is 10259 in FIG. 13. The rate of reduction of red portions is about 40%. Most of the reduction was that of iron erroneously discriminated as copper.

By utilizing the method of discriminating copper in the scrap based upon the first embodiment of the present invention, it is possible to improve precision of discrimination when the operation for discriminating the copper-containing scraps, that was carried out relying upon the eyes of the workers, is automatically carried out.

A second embodiment of the present invention will now be described. Reverting to FIG. 7, the image storage unit 27 receives RGB signals 26 from the CCD camera 23, converts them into HSI signals 28 and outputs them to the discriminating apparatus 29. The discriminating apparatus 29 stores the hue angles and a threshold value of saturation of copper, discriminates whether the scraps in the image labelled by the brightness I signal are copper-containing scraps or not, and outputs position data (X, Y) signals of the scraps that are discriminated to be the copper-containing scraps. In this embodiment, furthermore, the RGB signals 26 are stored in the image storage unit 27, converted into HSI signals and are output in order to simplify the timing process with which the image of iron scraps taken by the CCD camera 23 is received by the discriminating apparatus 29.

By using the discriminating apparatus shown in FIG. 7, it was attempted to discriminate iron scraps and motor core scraps consisting of iron and copper from the automobile shredder. The shredded samples used in the testing are obtained as described below. That is, waste such as that of automobiles, household electric appliances, etc. are shredded into scraps of a size of about 80 mm on the longest side. Cloth, non-metallic pieces such as plastic pieces and powder are removed by air. The non-metallic pieces and metallic pieces are separated from each other by the vortex-current separation. Then, iron and non-metallic pieces are separated from each other by the magnetic separation. The iron scraps having magnetic properties are thus separated. These scraps consist of iron scraps of iron only and motor core scraps which include copper. That is, the scraps used in the testing are those which were so far discriminated and separated by the eyes and manual operation of the workers.

Prior to really conducting the discrimination test, the following three kinds of preliminary tests were conducted to determine the setpoint values for the main test. First, a preliminary test was conducted to determine the saturation values and boundaries of hue angles for discriminating copper. Under optical conditions (source of light 24, condition for operating the CCD camera 23, dark room 22, distance between the instrument and the scrap to be discriminated) the same as those of during the discrimination operation, the distributions of hue angles possessed by copper scrap, iron scrap and the plate on which the scrap were placed, were measured.

Under the same conditions, furthermore, the distributions of saturation values possessed by the copper scrap, iron scrap and the plate were measured. From the results of these preliminary tests, the range of suitable saturation values S for discriminating copper and the range of hue angles H possessed by copper were found. As shown in FIGS. 8 and 9, the saturation values were ($0.3 \leq sat \leq 1.0$) (30), and the hue angles were ($0° \leq H 52°$ and $329° \leq H \leq 360°$) (31). In the discrimination testing described below, the saturation values and the boundaries of hue angles for discrimination were used.

Second, so-called labelling was conducted to recognize the individual scraps in the image using a brightness signal. By utilizing the fact that the belt conveyer is black and has a brightness signal of a very small value, a threshold value of brightness signal was set, the image was obtained in binary values, and the labelling was effected by using continuity of pixels of those portions having values larger than the threshold value. Then, the iron scrap and motor core scrap containing copper could be separated from the belt conveyer, and the bits of scrap could be easily recognized.

The threshold value of the brightness signal may have been set in advance. However, it need not be pointed out that various labelling methods proposed so far can be utilized to automatically set, as a threshold value, a value of, for example, 25% of the average brightness of the whole image so as to cope with changes in the intensity of the illumination light.

Third, a test was conducted to find a threshold value Rmin of the ratio R=SCu/St of St to copper area SCu that is necessary for discriminating whether the scrap contains copper or not. That is, the R-values were measured for all samples of 100 motor core scrap samples containing copper and 100 iron scrap samples. As a result, it was found that if Rmin=0, the motor core scrap and the iron scrap could be discriminated nearly completely.

That is, only two motor core samples were erroneously discriminated to be iron samples and only three iron samples were erroneously discriminated to be motor core samples. Here, however, it need not be pointed out that the setpoint value Rmin can be changed depending upon to what extent the mixing of the copper-containing scrap in the iron scrap is allowed in practically discriminating and separating the copper-containing scrap. The position (X, Y) of the center of gravity of the scrap discriminated as copper-containing scraps can be easily calculated by simply averaging the pixel positions of the scrap using a binary image based on the labelling.

Figure 14:
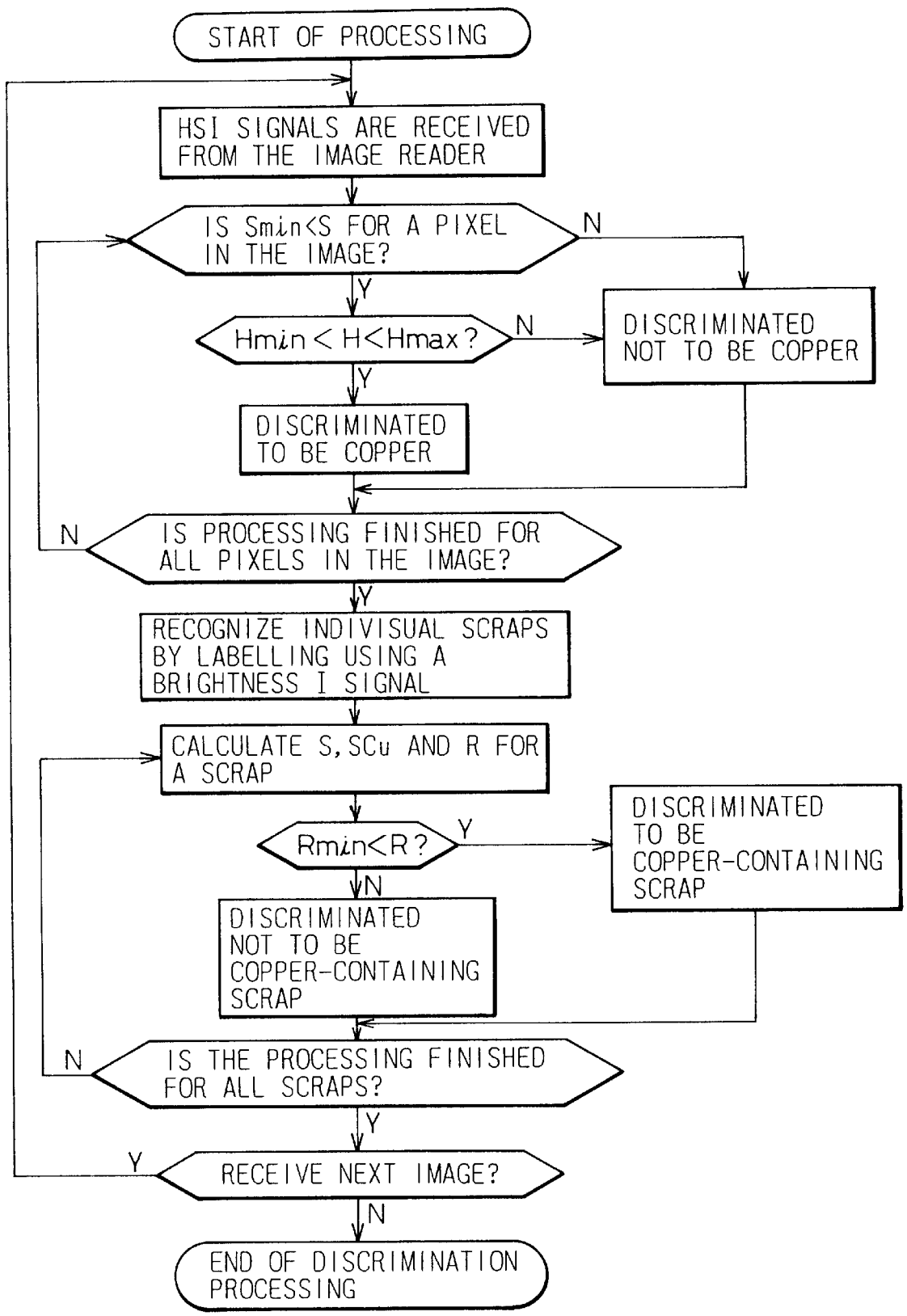
FIG. 14 is a flow chart of a discrimination processing employed in the embodiment.

FIG. 14 is a flow chart illustrating a concrete procedure of the discrimination processing executed by the discriminating apparatus 29 used in the practical discrimination testing. A hundred motor core scrap samples and 2400 iron scrap samples were mixed together in a random fashion and were sent onto a belt conveyer running at a speed of 60 m/min to conduct the discrimination testing. Since the discriminating apparatus 29 was capable of processing the image at a high speed in real time, tracking could be easily carried out by simply correcting the time delay in conveying the scraps to the separator device. The copper-containing scrap and the iron scrap that were separated from each other were analyzed. It was found that 17 iron scrap samples were erroneously contained in the copper-containing scrap and 4 copper-containing scrap samples were erroneously contained in the iron scrap, and it could be evaluated that the discriminating performance was practically satisfactory.

Figure 15:
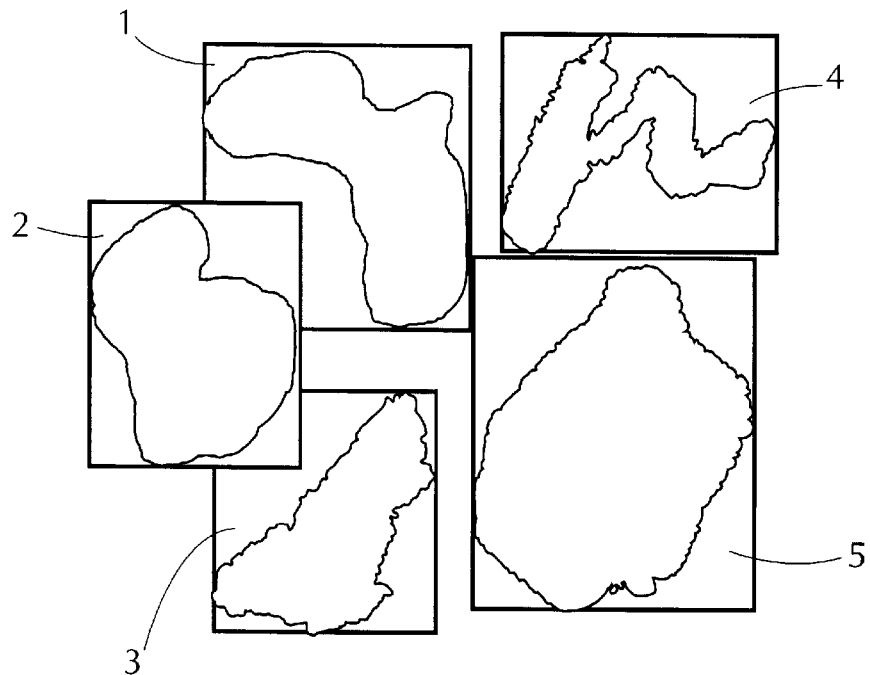
FIG. 15 is a diagram of discrimination by labelling using a brightness (I) signal.

FIG. 15 illustrates the result of recognizing the individual scrap on the belt conveyer using a brightness (I) signal of the image. In this case, the belt conveyer is black and exhibits a very small brightness. Therefore, the five scrap samples can be easily recognized by discriminating the continuity of the portions having values larger than the preset threshold value. The white regions are recognized to be the individual scrap samples and the total area St thereof is found.

Figure 16:
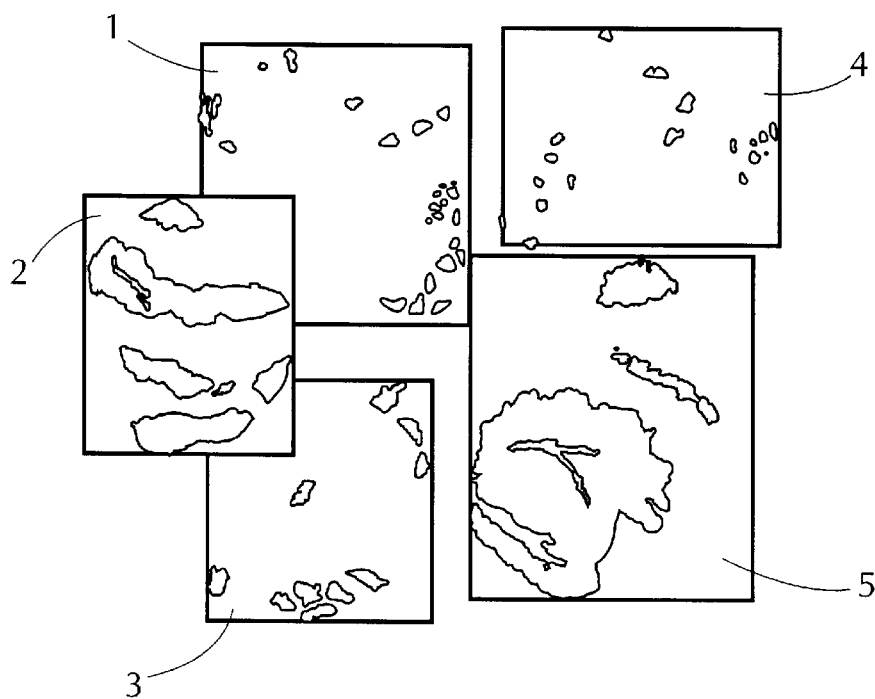
FIG. 16 is a diagram of discrimination of copper using a hue angle (H) signal and a saturation (S) signal.

FIG. 16 shows in white the pixels that are discriminated to be copper from the hue angle (H) signals and the saturation (S) signals of the image. The area SCu of the region is found, the region being discriminated to be copper in each of the scrap samples. As a result, the ratio R=SCu/St of the total area to the area of the region discriminated to be copper in each scrap samples is calculated, and the scrap 2 and 5 in FIG. 16 are discriminated to be copper-containing scrap, the scrap 2 and 5 having an R-value larger than the threshold value Rmin=0.1 with which the copper-containing scrap is discriminated.

The materials of the scrap samples were confirmed using the corresponding color image, and it was found that the scrap samples 2 and 5 were those of the pulverized motor core, and the remainder was iron scrap composed of iron only. Referring to FIG. 16, even the iron scrap samples 1, 3 and 4 contain regions that are discriminated to be copper. These were scrap surfaces painted red in a color close to the tone of copper, the surfaces that are rusted in red color, or the portions of which the hue angles and saturation values are those of copper due to illumination and the angle of reflection. Despite of such small erroneously discriminated portions, however, it is possible to easily prevent erroneous discrimination between the iron scrap and the copper-containing scrap by suitably setting the threshold value Rmin of the ratio R.

Figure 17:
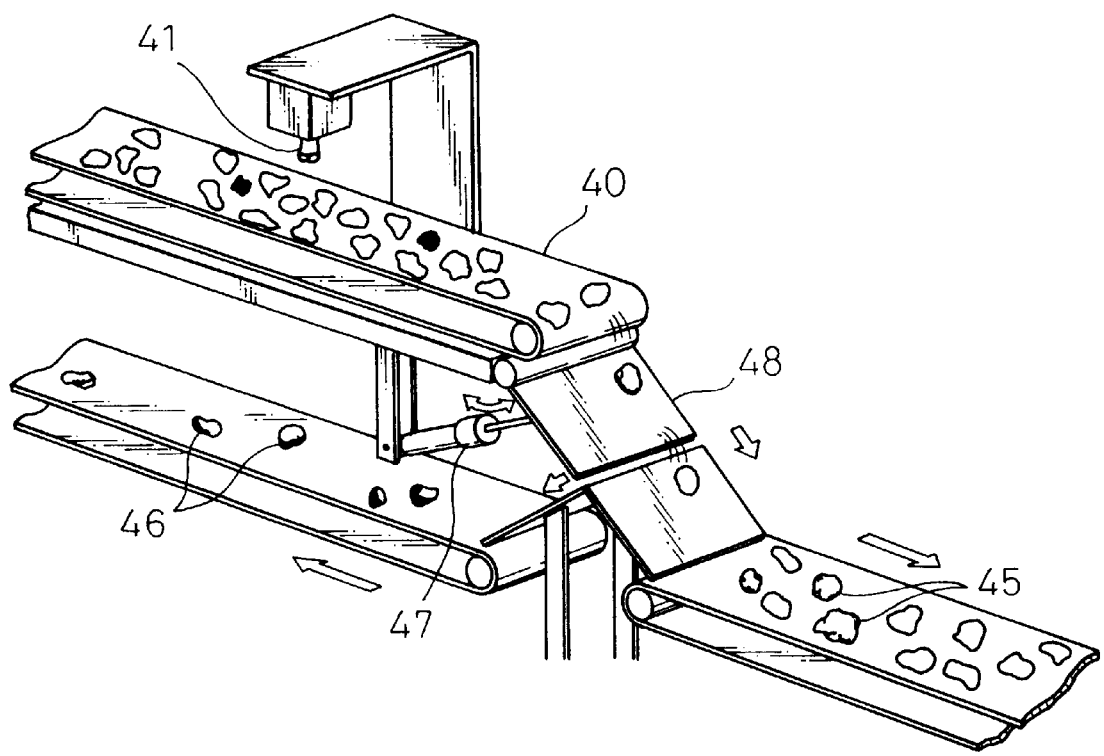
FIG. 17 is a diagram illustrating a discriminating/separating apparatus according to an embodiment.

By utilizing the method of discriminating copper in the scrap according to the second embodiment of the present invention, it is made possible to discriminate even that scrap in which copper wire and iron cores are mechanically entangled with each other such as motor core scrap over iron scrap, to obtain correct position data of the copper-containing scrap and to automatically carry out the discriminating and separating operations, in addition to obtaining the effects of the first embodiment FIG. 17 illustrates the constitution of a discriminating/ separating apparatus according to a third embodiment of the present invention. A belt conveyer is used as the conveyer means 40, and the scrap is two-dimensionally arranged in a random fashion on the belt conveyer. A color CCD camera is used as the imaging means 41 and image signals are transmitted to a discrimination means 42 that is not shown. In the case of this embodiment, a high-speed image processor coupled to a work station is utilized as the discrimination means.

The discrimination means transmits the position of the copper-containing scrap and the imaging time to the separator control means 43 which employs a sequencer that is not shown, whereby a delay in the conveying time is corrected and a drive signal is formed and is transmitted to the separator means. In this embodiment, use is made of a separator means constituted by an air cylinder 47 and a jump board 48, and the iron scrap 45 and the copper-containing scrap 46 are conveyed to the next step.

In the case of this embodiment, when the copper-containing scrap and the iron scrap are arranged in parallel in the direction of the width of the belt conveyer, the iron scrap is separated as copper-containing scrap together with the copper-containing scrap. However, as the object of discriminating and separating the copper-containing scraps is to prevent copper from being mixed into iron that is obtained by regenerating the iron scraps, there arises no particular problem.

The ratio of the amount of copper-containing scrap, such as of motor cores, in the shredded waste of automobiles and household electric appliances is several percent on a weight basis. Accordingly, the amount of iron scrap separated together with the copper-containing scrap is relatively small and does not lower the efficiency for regenerating the iron scrap. By batchwisely discriminating and separating again the group of scrap that was once separated as the copper-containing scrap, it is possible to improve the efficiency for separating the copper-containing scraps and the iron scraps.

The discriminating and separating processings may be repeated as required.

In the embodiment shown in FIG. 17, the imaging means 41 is surrounded by light-shielding plates (not shown) to decrease the effect of light in the surrounding such as of fluorescent lamps in the factory, and the scraps are imaged inside the light-shielding plates. The light-shielding plates, however, need not be provided, as a matter of course, when the effect of the surrounding light is weak. A four-point type source of light (not shown) is used to illuminate the scrap conveyed on the belt conveyer from four directions. Compared with the source of light that illuminates from one direction only, the four-point type source of light has the effect for decreasing the shade formed on the scrap and on the belt conveyer. The source of light is in no way limited to the four-point type source of light only provided it can suppress the formation of shade within a range that does not impair the discrimination processing.

The discriminating/separating apparatus according to the present invention can be realized in the forms that can be classified chiefly into four types depending upon (1) the state for arranging the scraps on the conveyer means, (2) imaging and discrimination processing, and (3) separation processing. The types of embodiments that can be realized are summarized in the following table.

| Type | |
|---|---|
| | Scrap arrangement on the conveyer means |
| 1 | Two-dimensionally arranged in a random fashion. Example: belt conveyer |
| 2 | Arranged being divided in the conveying direction<br>Example: tray conveyer,<br>belt conveyer with partitioning plates (in the conveying direction) |
| 3 | Arranged being divided in the direction of width<br>Example: belt conveyer with partitioning plates (in the direction of width) |
| 4 | Arranged being divided in the conveying direction and in the direction of width<br>Example: two dimensionally arranged tray conveyer |
| | Imaging and discriminating processing |
| 1 | Imaged with the image size as a unit in the conveying direction, and positions of the copper-containing scrap are discriminated at one time in the whole image. |
| 2 | A single division is imaged or a plurality of divisions are imaged as a unit, and the copper-containing scrap is discriminated for every division. |
| 3 | The whole image in the direction of width is imaged with the image size in the conveying direction as a unit, and positions of the copper-containing scrap are discriminated for every division in the direction of width. |
| 4 | A single division is imaged or a plurality of divisions are imaged as a unit on the whole region in the direction of width and in the conveying direction, and the copper-containing scrap is discriminated for every division. |
| | Separation processing |
| 1 | Batchwisely separated in the direction of width at a moment when the copper-containing scraps have arrived. |
| 2 | A division containing the copper-containing scraps is batchwisely separated. |

-continued

| Type | |
|---|---|
| 3 | Every division in the direction of width is separated at a moment when the copper-containing scraps have arrived. |
| 4 | Every division containing the copper-containing scraps is batchwisely separated in the direction of width. |

According to the first type, the scrap is two-dimensionally arranged in a random fashion on the conveyer means, and the imaging means basically images with the image size in the conveying direction as a unit to prevent overlooking the scrap. The whole image that is taken is processed at one time to discriminate the positions of the copper-containing scrap. At a moment when the copper-containing scrap has arrived, the separator means batchwisely separates the scrap in the direction of width of the conveyer means. That is, the discriminating/separating apparatus is realized in a form as shown in FIG. 17.

According to the second type, a mechanism that can be divided in the conveying direction exists on the conveyer means. Scrap can be thrown into each division. The imaging means images every single division or a plurality of divisions as a unit, and the presence of copper-containing scrap is discriminated for every division. After the division containing the copper-containing scrap has arrived, the separator means regards all the scrap in the division to be the copper-containing scrap and batchwisely separates them.

Figure 18:
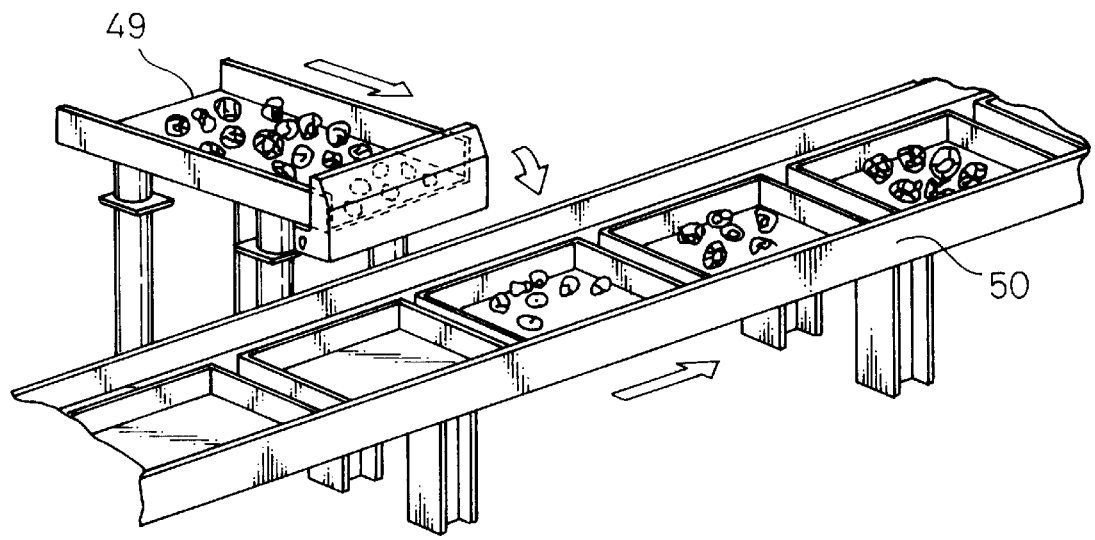
FIG. 18 is a diagram of one-raw tray conveyer according to an embodiment.

FIG. 18 illustrates an embodiment where a tray conveyer of a single row is used as the conveyer means. Scrap is continuously thrown in by the throwing means 49 and is introduced into the trays by a tray conveyer 50 having a structure divided in the conveying direction.

The imaging means (not shown) images one tray or a plurality of trays, and the discrimination means transmits to the separator control means whether copper-containing scrap is contained in the trays or not based upon the position data of the copper-containing scrap. Upon receiving drive signals from the separator control means, the scrap contained in the trays is batchwisely separated as copper-containing scrap or iron scrap. The scrap in each tray can be batchwisely and easily separated by tilting the tray toward a shooter for the copper-containing scrap or for the iron scrap.

According to the third type, a mechanism that can be divided in the direction of width exists on the conveyer means, the image of the whole region of the conveyer means in the direction of width is taken with the image size in the conveying direction as a unit to prevent overlooking of scraps, and the whole image that is taken is processed at one time. Then, from the position Y in the direction of width which is the position data of the copper-containing scrap, it is found in which division the scrap exists. This data and the position X of the scrap in the conveying direction are transmitted to the separator control means. The separator means has a mechanism that is capable of separating the scrap for each of the divisions, and separates the copper-containing scrap for each of the divisions upon receiving a drive signal from the separator control means.

Each division basically works in the same manner as the apparatus of the first type. Here, however, there is no need to provide any of the conveyer means, imaging means, discrimination means or separator control means for each of the divisions. It is therefore possible to discriminate and separate large amounts of scrap at a low cost.

Figure 19:
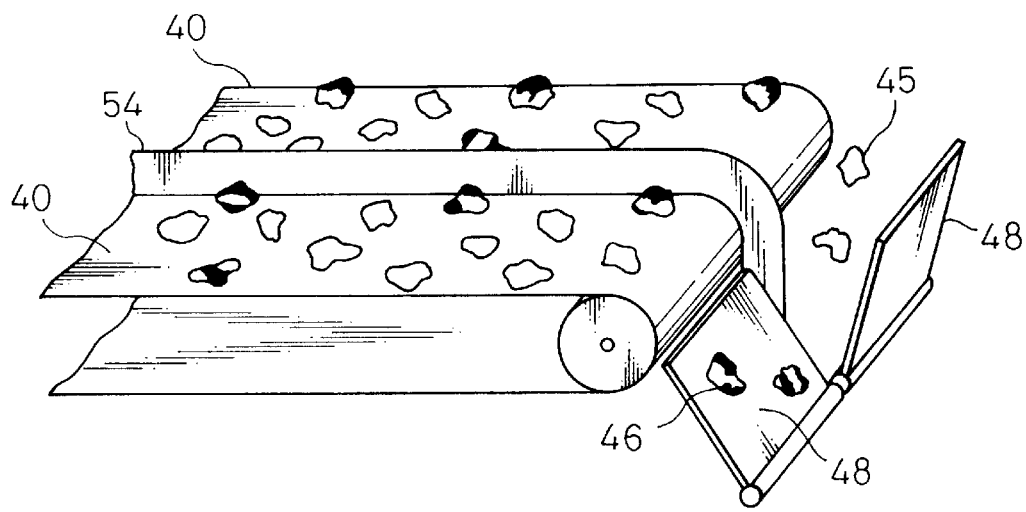
FIG. 19 is a diagram of a belt conveyer split into two in the direction of width according to an embodiment.

FIG. 19 illustrates an embodiment in which the discriminating/separating apparatus is constituted by providing a partitioning plate 54 and dividing the belt conveyer into two in the direction of width to use it as the conveyer means 40. The separation is accomplished by using jump boards 48 for the divisions. The discrimination processing finds, from the position Y of the copper-containing scrap in the direction of width, in which division the scrap exists, and the separator control means discriminates which jump board must be driven.

According to the fourth type, a mechanism that can be divided in both the direction of width and the conveying direction exists on the conveyer means. Scrap can be thrown into each division. The imaging means images each division or a plurality of divisions as a unit, and the presence of the copper-containing scrap is discriminated for each of the divisions. When the division containing the copper-containing scrap has arrived, the separator means regards all scrap in the division to be the copper-containing scrap and separates it batchwisely.

Figure 20:
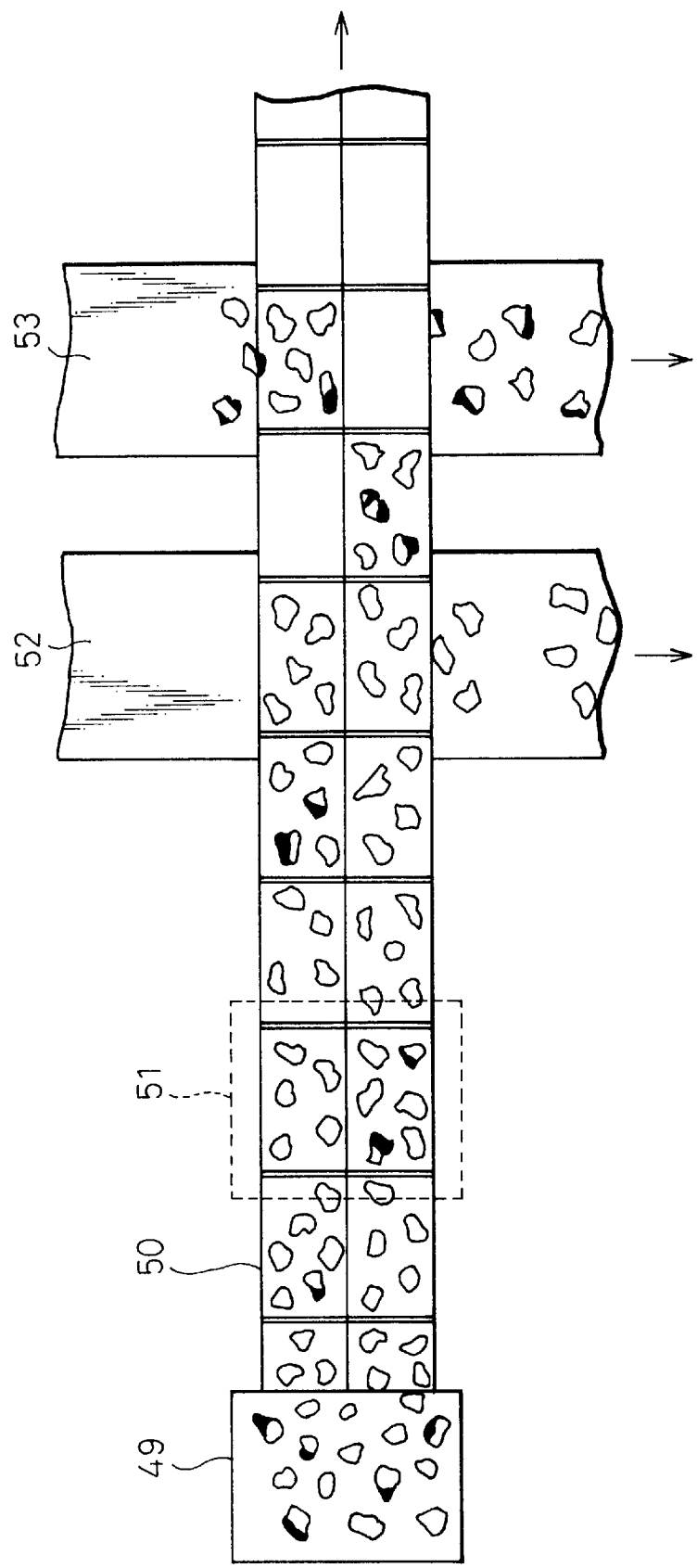
FIG. 20 is a diagram of a two-row tray conveyer according to an embodiment.

FIG. 20 illustrates an embodiment where two rows of tray conveyers are used as a conveyer means. Scrap is continuously thrown by the throwing means 49 and is introduced into the trays by a tray conveyer 50 having trays that are divided in the conveying direction and in the direction of width.

The imaging means (not shown), in this case, images two trays as represented by an imaging region 51, and the discrimination means informs the separator control means of whether copper-containing scrap is contained in the trays based upon the position data of the copper-containing scrap. Upon receiving a drive signal, the separator means (not shown) tilts the trays so that the scrap contained in the trays batchwisely falls onto a belt conveyer 53 for copper-containing scrap or onto a belt conveyer 52 for iron scrap.

In any of the above-mentioned types, iron scrap is separated as copper-containing scrap together with the copper-containing scrap when the copper-containing scrap and the iron scrap are arranged in parallel in the direction of width of the conveyer means such as belt conveyer or when the copper-containing scraps and the iron scraps are contained in a mixed manner in the same tray. There, however, occurs no problem since the object of discriminating and separating the copper-containing scraps is to prevent copper from infiltrating into the steel obtained by regenerating the iron scraps.

The ratio of the amount of the copper-containing scrap such as of motor cores in the shredded wastes of automobiles and household electric appliances is several percent on a weight basis. Accordingly, the amount of iron scrap separated together with the copper-containing scraps is relatively small and does not lower the efficiency for regenerating the iron scrap. By batchwisely discriminating and separating again the scrap that was separated as the copper-containing scrap, it is possible to improve the efficiency for separating the copper-containing scrap and the iron scrap. The discriminating and separating processings may be repeated as required.

When the processing speed of the discrimination means 42 is fast, furthermore, only one discrimination means is enough for processing color images from a plurality of imaging means 41. It therefore need not be pointed out that only one discrimination means may be used for a plurality of discriminating/separating apparatuses.

In any one of the four types shown in FIG. 1, the copper-containing scrap is discriminated on a plurality of conveyer means 40 relying upon a plurality of color images transmitted from a plurality of imaging means 41, the position (X, Y) data of all copper-containing scrap in the images and the imaging time are transmitted to the corresponding separator control means 43, and the separator means 44 are driven.

When, for example, a belt conveyer is used as a conveyer means and is operated at a conveying speed of one meter a second, the processing of 2.5 images a second is sufficient for preventing the overlooking of scrap provided the image size in the conveying direction is 0.4 m. When use is made of a discrimination means having ability for processing ordinary color camera images in real time, 30 images can be processed in a second. In this case, therefore, a maximum of 12 discriminating/separating apparatuses can be operated using a single discrimination means. In practice, however, some margin must be provided for the timing processing for inputting images and for outputting the processed results. Therefore, about eight discriminating/separating apparatuses can be operated by using a single discrimination means. This makes it possible to greatly decrease the cost of the discrimination means per each discriminating/separating apparatus.

By utilizing the apparatus for discriminating and separating the copper-containing scrap according to the third embodiment of the present invention, it is possible to discriminate the scrap in which copper wire and iron cores are mechanically entangled by each other, in addition to obtaining the effects of the first and second embodiments.

FIG. 21 is a diagram illustrating the constitution of an apparatus according to a fourth embodiment of the present invention for embodying a method in which the copper-containing scrap 46 separated by the separator are cooled to a temperature lower than the brittle fracture temperature of iron, by using a liquefied gas for, cooling, and are shock-pulverized, and the mixed iron-copper scrap consisting of iron scrap pulverized into fine pieces by shock-pulverization and copper scrap formed by pulverizing the copper wires of the motor cores, are easily separated into the iron scrap 45 and the copper scrap 63 by magnetic sorting.

According to the method of the present invention, the copper-containing scrap consisting chiefly of motor cores contained in the wastes of automobiles and household electric applicants shredded at normal temperature, are pulverized at low temperatures and are magnetically sorted. Therefore, large amounts of shredded scrap of automobiles and household electric appliances can be treated using a low-temperature pulverizer and a magnetic sorting apparatus of small size.

The low-temperature pulverizer shown in FIG. 21 is of a relatively small one which uses liquefied nitrogen gas as a liquefied gas for cooling and has a low-temperature pulverizing ability of 1,000 kg/hr which, however, is enough for treating the copper-containing scraps in the shredded wastes that are obtained by pulverizing at normal temperature about 50 passenger cars an hour. Furthermore, the magnetic separating apparatus shown in FIG. 21 treats iron and copper scrap that is pulverized into fine pieces by the low-temperature pulverizer, and is realized in a small size, since the input from the low-temperature pulverizer is as small as 1,000 kg/hr.

The apparatus for discriminating and separating the copper-containing scrap shown in FIG. 17, and the low-temperature pulverizer and the magnetic sorting apparatus shown in FIG. 21 were combined together to conduct the testing of discriminating and separating the copper-containing scrap (total weight of 1,000 kg) contained in the scrap from automobiles and household electric appliances shredded at normal temperature. The total weight of the iron scrap finally separated as the iron scrap by the copper-containing scrap discriminating/separating apparatus and the iron scrap separated by the magnetic sorting apparatus, was 978 kg, and the weight of the scrap separated as copper scrap was 22 kg. The weight of the copper scrap mixed into the iron scrap was about 0.2 kg, and the weight of the iron scrap mixed into the copper scrap was 0.4 kg. Thus, the iron scraps and the copper scraps were of a practically satisfactory quality.

To realize the discriminating/separating method according to the present invention, it becomes necessary to employ a magnetic separating apparatus to separate the iron-copper mixture scrap from the low-temperature pulverizer. In an ordinary scrap regeneration processing, a magnetic sorting apparatus is used in order to separate iron and non-ferrous metal pieces from the scraps that are shredded at normal temperature. It need not be pointed out that the cost of the facility can be decreased if this magnetic sorting apparatus is utilized.

By utilizing the method of the fourth embodiment of the present invention, it is possible to completely separate the groups of scraps having magnetic property in the scrap pulverized at normal temperature into iron scrap and copper scrap, and to regenerate large amounts of scrap at a low cost without relying upon man-power.

We claim:

1. A method for discriminating scrap containing copper from iron scrap after being pulverized, comprising:

imaging iron scrap using a color TV camera;

treating RGB signals possessed by each of the points in the image as a color vector;

finding a saturation value S represented by the length of said color vector;

finding a hue angle H represented by said color vector;

discriminating whether the saturation value S of the color vector is larger than a predetermined value of saturation of copper or not;

discriminating whether the hue angle H of the color vector lies within a predetermined range of hue angles of copper or not;

discriminating scrap containing copper from iron scrap when the saturation value S of the color vector is larger than the predetermined value and when the hue angle H of the color vector lies within the predetermined range.

2. A method according to claim 1, which further comprises:

finding a brightness value I from the RGB signals produced by each of the points in the image;

labelling the whole image using the brightness value I which represents the brightness of a pixel to recognize the scrap, and finding the total area St of the scrap, or finding the number of pixels occupied by the scraps;

finding the total number of the pixels discriminated to be a copper area SCu or discriminated to be copper in the image region occupied by said scrap; and finding a ratio R=SCu/St of the total area of the scrap St to the copper area SCu in the scrap, discriminating the scrap to be a copper-containing scrap when the ratio R is larger than a preset value Rmin, and finding a pixel address at the center of gravity (X, Y) thereof or at the center of gravity of the total area St.

3. A method according to claim 2, further comprising:

providing a conveyor means for conveying scrap to a separator means;

outputting position (X,Y) data corresponding to said pixel address at the center of gravity (X,Y) of all copper-containing scrap;

separating the scrap with said separator means into copper-containing scrap and iron scrap;

receiving position (X,Y) data of all copper-containing scrap in the image and the imaging time from the discrimination processing means; and calculating a time delay of the copper-containing scrap that is conveyed to the separator means based upon the position (X,Y) data and the imaging time, and driving the separator means when the copper-containing scrap has arrived at said separator means.

4. A method of discriminating and separating iron and copper from scrap having magnetic properties according to claim 3, further comprising:

pulverizing the copper containing scrap that is separated by said separator means at normal temperature;

shock-pulverizing the copper-containing scrap by cooling it at a temperature lower than the brittle fracture temperature of iron using a liquefied gas for cooling; and magnetically sorting the shock-pulverized scrap into iron scrap and copper scrap.

5. A method according to claim 1 wherein the predetermined value of the saturation of copper is set as 0.3.

6. A method according to claim 1 wherein the predetermined value of hue angles of copper is set as $0° \leq H \leq 52°$ and $329° \leq H \leq 360°$.

7. A method for discriminating scrap containing copper from iron scrap after being pulverized, comprising:

imaging iron scrap using a color TV camera;

treating RGB signals possessed by each of the points in the image as a color vector in three-dimensional space with R, G, B axes;

finding a saturation value S represented by the length of said color vector;

finding a hue angle H represented by said color vector;

discriminating whether the saturation value S of the color vector is larger than a predetermined value of saturation of copper or not;

discriminating whether the hue angle H of the color vector lies within a predetermined range of hue angles of copper or not;

discriminating scrap containing copper from iron scrap when the saturation value S of the color vector is larger than the predetermined value and when the hue angle H of the color vector lies within the predetermined range.

8. A method for discriminating scrap containing copper from iron scrap after being pulverized, comprising:

imaging iron scrap using a color TV camera;

treating RGB signals possessed by each of the points in the image as a color vector in three-dimensional space with R, G, B axes;

providing a unit plane on the space defined by R, G, B being equal to 1 in saturation;

projecting the color vector and the R, G, B axes on the unit plane from a direction perpendicular to the unit plane;

finding a saturation value S represented by the length of a projected color vector on the unit plane;

finding a hue angle H represented by an angle between said projected color vector and a projected R axes;

discriminating whether the saturation value S of the color vector is larger than a predetermined value of saturation of copper or not;

discriminating whether the hue angle H of the color vector lies within a predetermined range of hue angles of copper or not;

discriminating scrap containing copper from iron scrap when the saturation value S of the color vector is larger than the predetermined value and when the hue angle H of the color vector lies within the predetermined range.

* * * * *

UNITED STATES PATENT AND TRADEMARK OFFICE
CERTIFICATE OF CORRECTION

PATENT NO. : 5,911,327
DATED : June 15, 1999
INVENTOR(S) : Fumio TANAKA, et al.

It is certified that error appears in the above-indentified patent and that said Letters Patent is hereby corrected as shown below:

Column 2, line 43, before "pulverized" insert --being--.

Column 3, line 11, after "not" insert a comma.

Column 3, line 53, change ")'" to --0'--.

Column 6, line 33, change "needs" to --need--.

Column 8, line 61, change " $(0°≦H52°$ ..." to --$(0° \leq H \leq 52°$--.

Column 9, line 48, do not bold "17".

Column 18, line 2, change "axes" to --axis--.

Signed and Sealed this

Ninth Day of May, 2000

Attest:

Attesting Officer

Q. TODD DICKINSON

Director of Patents and Trademarks